US006931399B2

(12) United States Patent
Cheng et al.

(10) Patent No.: US 6,931,399 B2
(45) Date of Patent: Aug. 16, 2005

(54) METHOD AND APPARATUS FOR PROVIDING PERSONALIZED RELEVANT INFORMATION

(75) Inventors: Tony Cheng, New York, NY (US); Rajib Ghosh, Santa Clara, CA (US); Jim Donnelly, New York, NY (US)

(73) Assignee: Igougo Inc., New York, NY (US)

( * ) Notice: Subject to any disclaimer, the term of this patent is extended or adjusted under 35 U.S.C. 154(b) by 252 days.

(21) Appl. No.: 09/893,265

(22) Filed: Jun. 26, 2001

(65) Prior Publication Data

US 2003/0033301 A1 Feb. 13, 2003

(51) Int. Cl.7 .............................................. G06F 17/30
(52) U.S. Cl. ...................... 707/6; 707/2; 707/7; 707/8; 707/9; 707/10
(58) Field of Search ................... 707/1–10, 100–104.1, 707/200–205

(56) References Cited

U.S. PATENT DOCUMENTS

| | | | |
|---|---|---|---|
| 4,862,357 A | 8/1989 | Ahlstrom et al. ............ 364/407 |
| 4,885,685 A | 12/1989 | Wolfberg et al. ........... 364/401 |
| 4,961,582 A | 10/1990 | Van Lysel ................... 273/254 |
| 4,971,363 A | 11/1990 | Templet ....................... 283/67 |
| 5,018,766 A | 5/1991 | Templet ....................... 462/18 |
| 5,021,953 A | 6/1991 | Webber et al. .............. 364/407 |
| 5,094,460 A | 3/1992 | Morse et al. ................ 273/254 |
| 5,237,499 A | 8/1993 | Garback ..................... 364/407 |
| 5,253,166 A | 10/1993 | Dettelbach et al. ......... 364/407 |
| 5,265,879 A | 11/1993 | Garcon et al. .............. 273/254 |
| 5,331,546 A | 7/1994 | Webber et al. .............. 364/407 |
| 5,422,809 A | 6/1995 | Griffin et al. ............... 364/407 |
| 5,483,444 A | 1/1996 | Heintzeman et al. ....... 364/401 |
| 5,553,007 A | 9/1996 | Brisson ...................... 364/561 |
| 5,570,283 A | 10/1996 | Shoolery et al. ............ 364/407 |
| 5,648,900 A | 7/1997 | Bowen et al. ................. 705/5 |
| 5,732,398 A | 3/1998 | Tagawa ......................... 705/5 |
| 5,734,722 A | 3/1998 | Halpern ....................... 380/49 |
| 5,764,981 A | 6/1998 | Brice et al. ................. 709/101 |
| 5,832,451 A | 11/1998 | Flake et al. ................... 705/5 |
| 5,926,812 A | 7/1999 | Hilsenrath et al. ............ 707/5 |
| 5,948,040 A | 9/1999 | DeLorme et al. ........... 701/201 |
| 6,018,715 A * | 1/2000 | Lynch et al. .................. 705/5 |
| 6,182,068 B1 | 1/2001 | Culliss .......................... 707/5 |
| 6,199,067 B1 | 3/2001 | Geller ......................... 707/10 |
| 6,374,237 B1 * | 4/2002 | Reese ........................... 707/3 |
| 6,564,210 B1 * | 5/2003 | Korda et al. .................. 707/3 |

* cited by examiner

*Primary Examiner*—Jean M. Corrielus
*Assistant Examiner*—Issac M. Woo
(74) *Attorney, Agent, or Firm*—Howrey LLP

(57) ABSTRACT

A method and apparatus for providing to a user personalized information from an database comprising contributor content records and contributor profile records, based upon a comparison of the user's search query and user profile record with the contributor content records and contributor profile records. The database may contain other content records from which personalized information may be obtained. Contributors may provide additional contributor content records to the database, in exchange for valuable consideration.

5 Claims, No Drawings

METHOD AND APPARATUS FOR PROVIDING PERSONALIZED RELEVANT INFORMATION

BACKGROUND OF THE INVENTION

The coming of the Internet and Information Age has brought with it an explosion in the volume of information that is available to the public. Unfortunately, the vast majority of this information, for example, information relating to travel and travel-related topics, is available to the public only in an unorganized fashion. The sheer quantity of this information can make it nearly impossible for an individual to locate relevant information. Furthermore, there may be at the same time an actual shortage of the type of first-hand, personalized, particularly-relevant information that the individual may desire to locate.

For example, in the case of an individual seeking to plan a vacation, or merely seeking to learn more about a distant location, it is difficult to locate first-hand, particularly-relevant, travel-related information. The individual may rely upon his or her circle of trusted friends or even acquaintances to provide specific first-hand travel advice or experience information. Unfortunately, such advice and information will necessarily be limited by the number of the individual's friends or acquaintances, as well as by the travel habits of such persons. Travel agents may seek to provide an individual with customized travel-related information. However, the travel-related information from travel agents may not be first-hand or objective, being limited to the travel experiences of the agent and/or the agent's clients. Guidebooks may be used to obtain a limited amount of information concerning a travel destination. However, guidebooks suffer from several deficiencies, including the somewhat generic and oftentimes dated nature of their information. So too with travel-related magazines: the travel-information can be generic, rather than providing the sort of comprehensive and personalized first-hand information desired.

Internet-accessible travel magazines typically contain professionally-written travel content. However, the relevance of this content depends in large part upon how closely the personal preferences of the professional travel writer matches the personal preferences of the individual seeking information. The same is true in the case of Internet-accessible opinion sites, which are limited in their ability to take into account the personal preferences of the user.

Thus, there exists a real and continuing need for a computer-oriented method and apparatus designed to provide personalized content information, taking into account both the personal preferences of the user, as well as the personal preferences and/or other unique information of the content information provider.

SUMMARY OF THE INVENTION

The present invention generally relates to a method and apparatus for providing personalized information based both upon a user's search query, as well as based upon the user's personal preferences. There is provided a database containing contributor records that include contributor content records and contributor profile records. The database includes descriptor information corresponding to each contributor content record. Additional contributor content records may be added to the database, and valuable consideration may be provided to the contributor in exchange for his or her contribution. The database may optionally also include foundation content, travel provider content, or other types of content.

The present invention also includes a computer program adapted to receive a user's search query and personal preference information. The program then utilizes both the search query and the personal preference information to locate and display particularly relevant, personalized information from within the content records of the database.

DESCRIPTION OF ILLUSTRATIVE EMBODIMENTS

The present invention is generally directed to a method and apparatus for providing personalized information to a user from a database, based both upon the user's search query and the user's personal preferences.

The Database:

In one embodiment, a database is maintained on one or more server computers accessible to individual users and contributors via the Internet or World Wide Web. The database includes a plurality of contributor content records. Each content record may contain unique, specific information, composed by a contributor, concerning a topic of interest to that contributor. For example, a contributor content record may contain the contributor's account or journal of his or her experience at a restaurant, at a hotel, at a sight-seeing location such as a city or national park, or with a product or service. A contributor content record may comprise text, electronic pictures, electronically-recorded sound files, or the file.

Also stored within the database is descriptor information corresponding to each contributor content record. Descriptor information may comprise keywords or key terms describing or entitling the contributor content record. For example, for a contributor content record containing an account of a contributor's visit to an Italian restaurant in Bankok, Thailand, the corresponding descriptor information may comprise keywords such as, "restaurant", "expensive", "Bankok", "Italian food", "Ozio Restaurant", or the like. In another aspect of the invention, descriptor information may include a title, category and/or indexing descriptions. For example, on a contributor content record containing an account of a visit to a Canadian national park, the corresponding descriptor information may include a title such as "Home Lake Caves Provincial Park", and an descriptive index, "Canada>British Columbia>Vancouver Island". In one embodiment of the present invention, descriptor information corresponding to a contributor content record may be embedded in the contributor content record, rather than stored separately from the contributor content record within the database.

Corresponding to each contributor content record within the database is a contributor profile record. The contributor profile record may be designed to reflect the personal preferences and other information related to the contributor. To that end, a contributor profile record may include any number of data elements regarding the contributor, for example, data elements describing the contributor's personal identification information, travel-related preferences, product-purchase-related preferences, or the like.

For example, in one aspect of the present invention, the contributor profile record may include data elements regarding the contributor's personal identification information, travel interests information, travel-related attributes, dining and accommodation preference information, favorite destination information, and aspired destination information.

Personal identification information may include information such as the contributor's name, user name, e-mail or physical address, date of birth, age, gender, educational and professional background, income level, and free-form selfdescription information. Travel interests information may include information such as the contributor's favorite travel activities, for example natural wonders, arts festivals, hiking, fishing, bars and pubs, historical tours, and live performances. Travel interests information may also include information concerning the types of travel activities of the contributor, such as top attractions, local events, cruises, family fun, nightlife, arts and culture, great outdoors, shopping, sports, and specialty tours, and the like. Travel-related attributes may include such information as the contributor's preferences for adventure (for example, high, medium, or low), preferences for fitness-demanding travel experiences, sensitivity for cost, desire to travel "off the beaten path," and desire for higher culture. Dining preference information may include information such as the contributor's preferences for local cuisine, fine dining, healthy cuisine, or romantic dining. Accommodation preference information may include information such as the contributor's preferences for hotels, motels, bed and breakfast establishments, spas and resorts, rental condos/houses, camping, guest houses, hostels, timeshares, or the like. Favorite destination information may include information such as the contributor's favorite restaurants, hotels, national parks, cities, or the like. Aspirated destination information may include information such as the contributor's dream vacation locations, or dream hiking locations.

In one aspect of the present invention, the database includes contributor profile records submitted by contributors. A contributor profile record may also be updated, if desired, by a contributor, to reflect changes to his or her personal preferences. A contributor who wishes to submit a contributor profile or content record to the database may do so via any number of methods, for example via the Internet. When a contribution of a content record is made, a computer program in accordance with the present invention stores the contributor content record in the database, and assigns that record to correspond to the contributor's current contributor profile record. In another aspect of the present invention, descriptor information may be generated for the contributor content record, so that the content record may be more easily identified.

In one embodiment of the present invention, a contributor may be rewarded with valuable consideration in exchange for his or her contribution. That valuable consideration may take many forms, including currency, or credits redeemable for such things as prizes, travel equipment, airline tickets, or the like. In another embodiment of the present invention, a contributor content record may be rated according to its quality. Such rating may be performed by other contributors, by users, and/or by the maintainer of the database. Valuable consideration credited to the contributor may be varied according to such things as the content record's length, degree of detail, and/or rating by others.

In another aspect of the present invention, the database may include foundation content, such as records created not by contributors, but by commercial information providers. Such foundation content may include electronic versions of travel guidebooks from established companies. Foundation content may also include information from consumer protection groups, governmental agencies, or the like. In any case, such foundation content may include foundation content records, such as guidebook content records, and may also include descriptor information corresponding to each guidebook content record. Foundation content records may be licensed from their owner or owners by the maintainer of the database, and the maintainer may provide valuable consideration for its license. In an alternative, the owner(s) of the foundation content records may provide consideration to the maintainer of the database, in exchange for the provision of the content records to users and other parties.

The database may also include travel provider content, such as information from airlines, hotels and resorts, tour operators and guides, and the like. Such information may include information concerning a travel provider's available services, such a highlights, cost and reservation information, suitability for children or the elderly, or the like. In any case, such information may take the form of travel provider content records, and may include descriptor information corresponding to each travel provider content record. Likewise, travel provider content records may be licensed by the maintainer of the database, who may provide valuable consideration to the owner of the travel provider content records. Alternatively, the owner of the travel provider content records may provide consideration to the maintainer of the database. Such consideration may vary according to the number of users who access the content record, according to the number of users who access the travel provider's goods or services, and/or according to other factors.

In another embodiment of the present invention, foundation content or travel provider content may likewise be rated according to its quality, such rating being performed by contributors, by users, and/or by the maintainer of the database.

Providing Personalized Information:

The present invention may include a device for accessing and querying the database to provide a user with personalized information. In one embodiment, the invention includes a computer program running on one or more server computers, such that a user may connect and interact with the program via the Internet.

It should be noted that the term "user" as used herein is intended to refer to an individual seeking information from the database. A user may take the role of a contributor by providing a contributor content record; and likewise, a contributor may take the role of a user by querying the database for information.

Associated with each user is a user profile record. Such user profile record may contain the same or similar types of preference information relating to the user, as a contributor profile record may contain relating to a contributor. The user's user profile record may be conveniently stored within the database, but it need not be.

According to one aspect of the present invention, a user seeking particularly relevant, personalized information may transmit a search query to the database via the Internet. It will be understood that the user may initiate this search query via any number of convenient means, for example, by entering a keyword, or by clicking on a hyperlink from a webpage. Suitable keywords will, of course, depend upon the subject matter of contributor content records available in the database, and especially upon the information contained in the descriptor information corresponding to the contributor content records. The transmitted search query, along with the user's user profile record, are then used by the computer program's content match algorithm to identity and present contributor content records that may be particularly relevant to the user.

In one embodiment of the current invention, the computer program compares a user search query with descriptor information corresponding to contributor content records to identify generally responsive contributor content records. Such methods are well known in the art, and so for brevity will not be discussed here. The computer program also compares the user profile record with each of the contributor profile records corresponding to the responsive contributor content records just identified. Alternatively, the program may first compare a user profile record with contributor profile records to identify contributors whose content records may be expected to be particularly relevant to the user, and then compare the user search query with descriptor information corresponding to those contributor content records that may be expected to particularly relevant.

It will be appreciated that the exact methods and procedures for comparing a user profile record with a contributor profile record will necessarily depend upon the particular format of the profile records. For example, a profile record may include a plurality of data elements, where each data element contains one or more discrete pieces of information concerning the record's author. Thus, any number of comparison algorithms may be suitable.

In one embodiment of the present invention, any number, D, of corresponding data elements from user and contributor profile records are compared with each other to generate D comparison score(s). According to the present invention, D may be any positive integer, but may preferably be greater than or equal to 2, or greater than or equal to 3. The comparison scores are then combined via a suitable formula, that for example may appropriately weigh each of the comparison scores, to calculate a match rating between the user profile record and the contributor profile record. This match rating may then be used to further personalize and rate for relevancy the previously-identified contributor content records.

In one embodiment, a profile record may contain a data element representing the author's gender. Should a user profile record include a data element containing information representing a male author, and a contributor profile record include a corresponding data element containing information representing a female author, then there would be generated for that data element a comparison score of 0. Likewise, should the respective user and contributor profile records include a data elements containing information representing authors having the same gender, then there would be generated for that data element a comparison score of 1.

Similarly, a profile record may include a data element containing information representing the author's age. Such information may take the form of an integer representing the author's age in years, that is, 0 to 100+. A suitable comparison score, scaled to generate a comparison score between 0 and 1, may be generated by determining the absolute age difference between the ages represented in corresponding data elements of a user and contributor profile record, dividing that difference by the average of such ages, and then subtracting this quotient from 1.

In another embodiment, age-related information within a data element may take the form of an integer representing a range of ages, for example, 0 for ages 16–20; 1 for ages 21–29; 2 for ages 30–39; 3 for ages 40–49; 4 for ages 50–59; 5 for ages 60–69; for ages 70+. For this embodiment, a suitable comparison score, scaled to generate a comparison score between 0 and 1, may be generated by determining the absolute difference between the age ranges represented in corresponding data elements of a user and contributor profile record, subtracting that difference from 6, and then dividing the result by 6.

Where a data element of a profile record of the present invention comprises a rank-ordered list of a contributor's or user's N personal preferences, favorite interests or favorite activities, a more complex comparison algorithm may be employed. For example, in one particular embodiment, a user and contributor profile records may include data elements representing the user's and contributor's N favorite travel interests or activities.

| Data element from<br>User Profile Record | Data element from<br>Contributor Profile Record |
|---|---|
| (1) Activity A | (1) Activity B |
| (2) Activity B | (2) Activity Y |
| (3) Activity C | (3) Activity Z |
| . . . . | . . . . |
| (N) Activity X. | (N) Activity A |

In such a case, it may be desirable to generate a comparison score that counts not only the absolute number of activities in common between the user profile record and the contributor profile record, but also takes into consideration the relative rank of the common activity within the records.

A data element above from a user profile record may be represented as an array, UserProfile.Activity [j], representing a rank-ordering of the user's favorite activities. A data element from the corresponding contributor profile record may be represented as array ContributorProfile.Activity [k]. A suitable comparison score, represented as Score.Activity, may be generated by means of the following nested-loop algorithm:

```
Score.Activity = 0
for j = 1 to N
    for k = 1 to N
        if UserProfile.Activity [j] = ContributorProfile.Activity [k] then
            Score.Activity = Score.Activity + {[N –
            (j + k)/2] + 2 * [N – avg.(j, k)]}
        end if
    endfor
endfor
```

The resultant comparison score may be appropriately scaled to a value from 0 to 1 by dividing it by $[(3 N^2)-N (N+1)/2]$. Alternatively, a suitable comparison score may be generated by substituting the following formula in the above nested-loop algorithm:

$$\text{Score.Activity} = \text{Score.Activity} + \{[N-(j+k)/2] * [N - \text{avg.}(j, k)]\}$$

This alternative resultant comparison score may appropriately be scaled to a value from 0 to 1 by dividing it by $\{N*[N^2-N-(N-1)!]\}$.

In certain embodiments of the present invention, user and contributor profile records may each include a data element containing information representing a user's and contributor's respective five favorite travel interests or activities, and a travel activity comparison score may be generated according to the above methods.

In another embodiment of the present invention, user and contributor profile records may each include a data element containing information representing a user's and contributor's respective two favorite or preferred types of dining. A dining preference comparison score may be generated according to the above methods.

In still another embodiment of the present invention, user and contributor profile records may each include a data element containing information representing a user's and contributor's respective two favorite or preferred types of accommodations. An accommodation preference comparison score may also likewise be generated according to the above methods.

User and contributor profile records according to the present invention may also include data elements representing a user's and contributor's respective favorite or preferred types or categories of travel activities, for example, top attractions, local events, cruises, family fun, nightlife, arts and culture, great outdoors, shopping, sports, and specialty tours. In one embodiment, a user or contributor entering his or her profile record information may be requested to choose and rank, from a provided list, his or her five favorite travel interests or activities. Associated with each of the provided choices for favorite travel interests or activities, is a particular type or category of the interest or activity. For example, travel interests/activities such as beaches, hiking, park/reserves, and the like, may be associated with an appropriate type or category, such "great outdoors." Continuing this example, likewise, travel interests or activities such as museums, theater, music, galleries, and the like, may be associated with an appropriate type or category, such as "arts and culture." As such, a user or contributor choosing his or her five favorite travel interests or activities likewise has chosen one or more (but no more than five) favorite travel types or categories of travel activities.

Such a data element of a user profile record may be compared with a corresponding data element of a contributor profile record, and a type-of-travel-activity comparison score may generated, by simply adding together the number of common types of travel activities with respect to the corresponding data elements, and dividing this sum by maximum number of common types of travel activities with respect to the data elements.

User and contributor profile records according to the present invention may also each include a data element containing information representing the user's and contributor's respective travel attributes. In certain embodiments of the invention, such a data element may include information relating to such topics as a user's or a contributor's desire for adventure, fitness level, budget requirements, desire to travel off the beaten path, desire for higher culture, and family status. To that end, a user or contributor entering his or her profile record information may be requested to specify: high, medium, or low, with respect to the preceding first five topics; and this information may of course be represented by any suitable set of values, for example, 0, 1, and 2. A user or contributor entering his or her profile record information may also be requested to specify yes or no, with respect to whether the user or contributor intends to be traveling as a family unit; and this information may be represented by suitable values, 0 and 1.

In a preferred embodiment of the current invention, a travel attributes data element from a user profile record is compared with a corresponding data element from a contributor profile record. A travel attribute comparison score may be generated via any of several formulas. According to one embodiment of the invention, a travel attribute comparison score is generated by simply adding together a number of generated subscores, and dividing this sum by the number of subscores used. For example, a adventure subscore may be generated by determining the absolute difference between the value representing a user's desire for adventure and the value representing a contributor's desire for adventure, and by subtracting this difference from one. Other subscores, for fitness level, budget requirements, desire to travel off the beaten path, and desire for higher culture, may similarly be generated. A family subscore may be generated by simply assigning a score of 1 when the family status information in the user profile record is the same as that of the contributor profile record, and assigning a sub-score of 0 when the family status information in the user profile record is not the same as that in the contributor profile record.

According to another aspect of the invention, a travel attribute comparison score is generated as follows. Attribute subscores are generated for all attributes other than budget and family status, according to the method above, i.e., by determining the absolute difference between the value representing a user's particular attribute and the value representing a contributor's corresponding attribute, and by subtracting this difference from one. A budget attribute subscore is generated by determining the absolute difference between the value representing a user's budget requirements and the value representing a contributor's budget requirements, by dividing this difference by three, and then by subtracting this quotient from one. The travel attribute comparison score, having a range from 0 to 1, is then generated by adding together each of the attribute subscores, and then dividing this sum by the number of attributes.

Of course, it will be understood that the various comparison score generation II methods discussed above are presented by way of example only, and not limitation. One of ordinary skill working within the scope of the present invention with the benefit of this disclosure will comprehend that other comparison score generation methods may be suitable, depending upon the particular types of information represented by corresponding data elements within user and contributor profile records. Moreover, it will also be understood that data elements within the scope of the present invention may contain profile information in formats other than the exemplary formats disclosed above, and that one of ordinary skill with the benefit of this disclosure will easily be able to design suitable comparison score generation methods within the scope of the current invention appropriate for these other data elements.

In one embodiment of the present invention, a match rating is calculated between a user profile record and a contributor profile record by simply adding together any number of D comparison scores, as discussed above. For example, a suitable match rating may be calculated by summing the generated comparison scores for age, travel attributes, travel activity, and type-of-travel-activity. In another embodiment, the match rating may be calculated by suitably weighting the comparison scores prior to adding them together. For example, another suitable match rating may be calculated by adding together the weighted comparison scores for type-of-travel-activity, travel attributes, travel activity, dining preference, and accommodation preference, where the preceding comparison scores are weighted by multiplying them by weighting factors of 5, 5, 3, 1, and 1, respectively. Still another suitable match rating may be calculated by adding together the following weighted seven comparison scores: age, gender, type-of-travel-activity, travel attributes, travel activity, dining preference, and accommodation preference, wherein the preceding comparison scores are weighted by multiplying them by weighting factors of 5, 5, 5, 5, 3, 1, and 1, respectively.

It will also be understood that the various match rating calculation methods discussed above are presented by way of example only, and not limitation. One of ordinary skill working within the scope of the present invention with the benefit of this disclosure will comprehend that other match rating calculation methods may be suitable, depending upon the particular types of information represented by the various comparison scores.

As discussed above, as a result of the above comparisons, there is calculated a match rating describing the degree to which a user and a contributor share the same personal preferences. This match rating may be used to personalize the content information provided to a user. For example, in one embodiment of the present invention, selected contributor content records may be displayed to a user, based upon the results of a user search query. Alongside the contributor content records, there may be displayed indications of the match ratings calculated for the contributor profile records associated with the displayed contributor content records. Optionally, other information may also be displayed alongside a contributor content record, such as an indication relating to the quality and/or popularity of the contributor content record.

In another embodiment of the present invention, a limited number of contributor content records may be selected for display based upon both the user query and the match rating. This may of course be accomplished in several ways. For example, in one embodiment, a number of the contributor content records may be identified based upon the results of a comparison between the user search query and the descriptor information corresponding to the contributor content records. A match rating is calculated for these identified contributor content records, and the records are then displayed in their order of particular relevance as determined by their match ratings. Alternatively, only a particularly-relevant number or portion of the previously-identified contributor content records may be displayed, again based upon their relatively-high match ratings.

For each of the above embodiments, other personalized information may optionally be displayed alongside a contributor content record, such as an indication relating to the quality and/or popularity of the contributor content record.

In other aspects of the present invention, the database may also include foundation content, including content records from commercial sources. It may include travel provider content, including travel provider content records. Descriptor information may be associated with either of these types of content records. Such foundation content and travel provider content may be accessed when a user enters a search query. In response, the computer program compares the search query with the descriptor information in order to identify and display responsive foundation and/or travel provider content records.

Other Aspects of the Invention:

In a still further aspect of the current invention, personalized information may be provided as follows. The descriptor information corresponding to contributor content records may be configured to include one or more data elements having formats compatible with at least one or more of the data elements contained in a user profile record. For example, a contributor content record may include an account of a contributor's visit to a museum in a certain city. Corresponding to this content record may be certain descriptor information as previously discussed above, including keywords, a title, category and/or index descriptions, or the like: for example, "Moscow," "Russia," "art museum," etc. According to this further aspect of the present invention, descriptor information for this content record may include one or more data elements describing the content record's specific subject matter, for example, data elements such as the following: travel interests or activity (museum), type or category of travel activity (arts and culture), and travel attributes (adventure=medium; required fitness=low; budget requirement=low; off-the-beaten path=low; culture=high; family friendliness=medium), or the like. In this instance, the descriptor information of a contributor content record may be compared with a user's user profile record. As in the case of the comparison of a user profile record to a contributor profile record, it will be appreciated that a number of suitable methods may be used to generate comparison scores between compatible data elements, and a number of suitable formula may be used to further calculate a match rating between a user profile record and the compatible portion of the descriptor information associated with a contributor content record.

Thus, personalized information, including selected or relevancy-rated contributor content records, may be obtained by a user from a database, based upon a comparison of a user profile record with both (i) at least two contributor profile records; and (ii) the descriptor information associated with the contributor content records. For example, in one embodiment, the mechanism for obtaining this personalized information may include the combination of two separately-calculated match ratings. That is, there may be combined a first match rating, calculated for a user profile record and a contributor profile record, and a second match rating, calculated for the user profile record and the appropriate portion of the descriptor information associated with a corresponding contributor content record. In another embodiment, data elements from a user profile record may be compared with those from both a contributor profile record and from corresponding descriptor information, according to the above methods. However, rather than using calculating two separate match ratings, there may be calculated a single, combined match rating.

In other embodiments of the current invention, descriptor information corresponding to foundation content records may also be configured to include one or more data elements compatible with one or more data elements of a user profile record. Similarly, descriptor information corresponding to travel provider content records may also be configured to include one or more such compatible data elements. In either case, additional personalized information, including selected or relevancy-rated foundation or travel provider content records, may be obtained according to the present invention. For these embodiments, a user may submit a search query to a computer program of the present invention. As before, the program compares the user search query with at least a portion of descriptor information corresponding to foundation or travel provider content records, and identifies generally responsive foundation or travel provider content records. The program also obtains the user's user profile record, compares it with a compatible portion of the descriptor information corresponding to the identified generally responsive foundation or travel provider content records. From this comparison the program calculates a suitable match rating for each of the identified generally responsive foundation or travel provider content records. Using these comparison results, the program then provides the user with the desired particularly-relevant, personalized information, including selected or relevancy-rated foundation or travel provider content records.

In another embodiment of the current invention, the computer program may provide a mechanism for a user to identify contributors and/or other users having similar personal preferences. Upon receiving such a request from a user or from another source, the program may compare the user's user profile record to any number of contributor profile records, and optionally, to any number of the user profile records of other users, and for each may calculate a match rating according to the methods described above. A user may then receive a listing of contributors or other users having similar personal preferences, and may also be provided with at least a portion of those contributors' or users' profile records. In this way, a user may learn about and contact individual contributors and other users, and perhaps seek out further information concerning their shared interests.

Although specific embodiments of the invention have been described herein in some degree of detail, this has been done merely to illustrate various features and aspects of the present invention, and is not to be construed as limiting the scope of the invention as defined by the claims which follow. Those of ordinary skill in the art will appreciate that various substitutions, alterations, and/or modifications, including but not limited to those design variations and options that have been specifically noted herein, may be made to any of the embodiments of the invention disclosed herein without departing from the spirit and scope of the claims which follow.

What is claimed is:

1. A method of providing personalized information comprising:
   a) providing a database comprising a plurality of contributor content records and a plurality of contributor profile records, wherein each contributor content record corresponds to a contributor profile record; and wherein the database further comprises descriptor information corresponding to the contributor content records;
   b) obtaining a user profile record;
   c) obtaining a user search query;
   d) comparing the user search query with at least a portion of the descriptor information;
   e) comparing at least a portion of the user profile record with at least two contributor profile records;
   f) providing personalized information comprising contributor content records based upon the results of the comparisons in (d) and (e) above,
   wherein the user profile record and the contributor profile records each comprise a plurality of corresponding data elements, and
   wherein the step of comparing at least a portion of the user profile record with at least two contributor profile records comprises the steps of:
      i) comparing a first data element of the user profile record with a corresponding first data element of a first contributor profile record to generate a first comparison score;
      ii) comparing a second data element of the user profile record with a corresponding second data element of the first contributor profile record to generate a second comparison score;
      iii) combining the generated comparison scores to calculate a first match rating between the user profile record and the first contributor profile record;
      iv) repeating steps (i)–(iii) using a second contributor profile record to calculate a match rating between the user profile record and the second contributor profile record; and
      v) using the calculated match ratings to provide the personalized information.

2. A computer apparatus for providing personalized information comprising:
   a) a database comprising a plurality of contributor content records, each record corresponding to a contributor profile record, and each record corresponding to descriptor information; and
   b) a computer program adapted to receive a user profile record and a user search query, the program comprising a content match algorithm adapted to compare at least a portion of the user profile record with at least a portion of at least two contributor profile records, and to compare the user search query with at least a portion of the descriptor information, such that there is generated personalized information comprising contributor content records in response to the user search query,
   wherein the computer program is further adapted to receive an additional contributor content record into the database, and to provide valuable consideration to a contributor in exchange for the contributor's provision of the additional contributor content record,
   wherein the user profile record includes at least two personal travel data elements related to a user, and wherein each contributor profile record includes at least two corresponding personal travel data elements related to a contributor, and
   wherein the content match algorithm compares at least a portion of the user profile record with at least a portion of a contributor profile record by the steps of:
      i) comparing a first personal travel data element of the user profile record with a corresponding first personal travel data element of the contributor profile record, and generating a first comparison score;
      ii) comparing a second personal travel data element of the user profile record with a corresponding second personal travel data element of the contributor profile record to generate a second comparison score; and
      iii) combining the generated comparison scores to calculate a match rating between the user profile record and the contributor profile record.

3. The computer apparatus of claim 2, wherein the step of combining each of the generated comparison scores includes multiplying each generated comparison score by a weighting factor to calculate a product, and adding each calculated product together to calculate the match rating.

4. The computer apparatus of claim 2, wherein the personalized information comprises a displayed list of selected contributor content records, and for each content record, an indicator of its relevance corresponding to the its match rating.

5. The computer apparatus of claim 2, wherein the personalized information comprises a displayed list comprising selected contributor content records, the content records displayed in an order relating to their relevance as determined by the match ratings for each displayed content record.

* * * * *